UNITED STATES PATENT OFFICE.

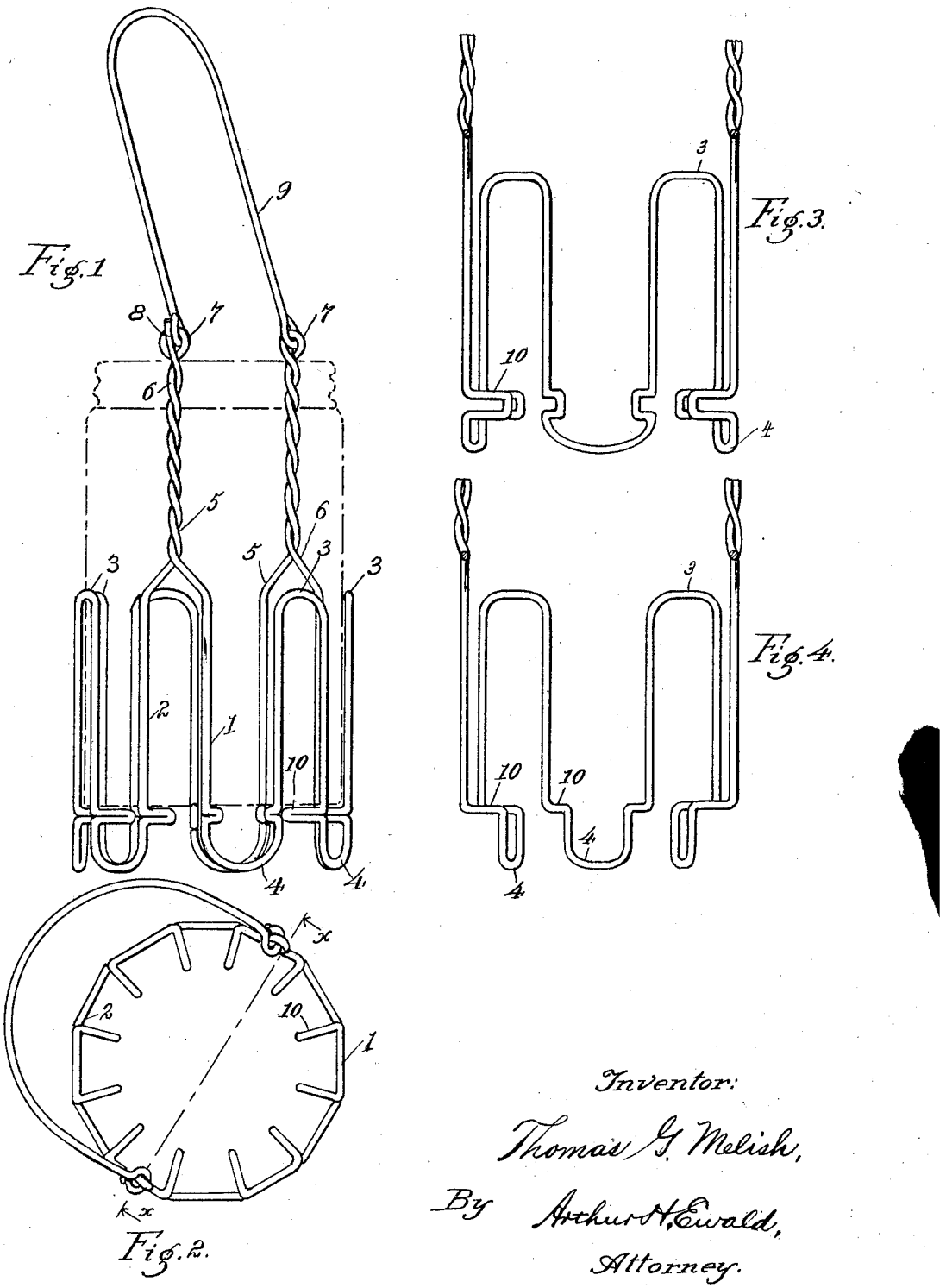

THOMAS G. MELISH, OF CINCINNATI, OHIO.

HOLDER FOR FRUIT-JARS.

1,385,841.　　　　Specification of Letters Patent.　　Patented July 26, 1921.

Application filed April 17, 1919. Serial No. 290,776.

*To all whom it may concern:*

Be it known that I, THOMAS G. MELISH, a citizen of the United States, and a resident of Cincinnati, in the county of Hamilton and State of Ohio, have invented certain new and useful Improvements in Holders for Fruit-Jars, of which the following is a full, clear, and exact description, reference being had to the accompanying drawings, forming a part of this specification.

The present invention relates to devices for holding glass jars during the process of sterilizing or preserving fruits or vegetables.

By a process of increasing popularity in the canning and preserving of fruits and vegetables, the articles to be preserved are placed in the jars in a raw state, and the jars then placed in a receptacle containing boiling water. It is well known that for the successful operation of this method of canning and preserving it is desirable, and even necessary, that the jars be supported with their bottoms somewhat above the bottom of the receptacle containing the boiling water, for the reason that when the jars rest immediately upon the bottom of the receptacle the steam generated beneath is apt to damage the jars.

The principal object of the present invention is to provide a holder adapted for the holding of jars during the sterilization and preserving of fruits and other articles by the above method, the said holder being of substantial and simplified construction.

A further object of the invention is to provide a device of the character mentioned of increased stability when resting upon its base, so that the jars are given additional protection.

Another object of the invention is to provide in a holder of the character mentioned, supports of improved rigidity for the jar to rest upon.

A still further object is to provide in a holder a simplified support for the bail or handle suitable for maintaining the same in an elevated position when the device is in use.

Other objects of the invention will appear from the following detailed description thereof.

In the drawings:

Figure 1 is an elevation of the invention with a jar inserted therein.

Fig. 2 is a plan view thereof without the jar.

Fig. 3 is a vertical section of the holder in a slightly modified form.

Fig. 4 is a similar section of a further modification.

The holder, as constructed in accordance with the present invention, consists of wires 1 and 2, the same being bent to form vertical members or loops, preferably rounded to form top members 3, and bottom or foot members 4. Each of the wires thus bent forms a semi-cylindrical frame having upwardly extending portions 5 and 6, the portion 6 terminating in loops or eyes 7, as shown. The two semi-cylindrical frames are secured together by twisting the respective ends 5 and 6 together, as shown, either one or both of the ends 8 of portions 5 extending across the eye or eyes 7, as shown in Fig. 1, to form a stop or stops for the bail 9 to maintain it in elevated position when desired.

The frames formed of wires 1 and 2, when thus assembled form a cylindrical holder, as best shown in Fig. 2.

Somewhat above the foot members 4, the wires are bent inwardly to form jar supporting members 10, all of which, of course, are required to be on the same horizontal plane. The jar supporting members 10 may be formed either with contiguous return folds as shown in Fig. 1, with spaced return folds as shown in Fig. 3, or, as shown in Fig. 4 the return folds may be omitted entirely and the foot members 4 be formed below the inner terminus of each jar supporting member 10. Further modifications within the purview of this disclosure will also be obvious to those skilled in the art to which this invention appertains, for instance jar supporting members may be omitted from certain of the foot members.

The use and operation of the device will be apparent from the foregoing description. A jar containing fruits or vegetables to be preserved is placed in the holder and the latter, containing the jar, is placed in the receptacle containing boiling water. The holder by reason of its construction has elasticity such as permits it to receive jars of various sizes. As will be noted, each foot member is provided with a jar supporting member, or conversely, each jar supporting member has a foot member immediately under it, thus providing the maximum stability and security against tilting or upsetting to the device as a whole, and also providing maximum rigidity to the jar support and adapting the device to hold jars of any weight with perfect safety and security. When in use the bail 9 is maintained in elevated position, as shown in Fig. 1, so as not to become greatly heated and to be accessible for use.

Having thus fully described my invention what I claim as new and desire to secure by Letters Patent is:

1. A holder for jars comprising a wire frame bent to form vertical loops, top and foot members and jar supporting members intermediate the length of certain of the vertical portions of said loops, all portions of each of said jar supporting members being in the same vertical plane with the vertical loop portion in which it is formed.

2. A holder for jars comprising a frame, said frame consisting of two wires, each of which is bent to form a semi-cylindrical frame member, having upwardly extending ends, eyes formed on opposite ends of the respective wires, said frame members being secured by twisting together opposite ends of the respective wires, each of said frame members comprising vertical loops, top and foot members and jar supporting members intermediate the length of certain of the vertical portions of said loops, all portions of each of said jar supporting members being in the same vertical plane with the vertical loop portion in which it is formed, and a bail secured in said eyes.

3. A holder for jars comprising a frame, said frame consisting of two wires, each of which is bent to form a semi-cylindrical frame member having upwardly extending ends, eyes formed on opposite ends of the respective wires, said frame members being secured by twisting together opposite ends of the respective wires, each of said frame members comprising vertical loops, top and foot members and jar supporting members intermediate the length of certain of the vertical portions of said loops, all portions of each of said jar supporting members being in the same vertical plane with the vertical loop portion in which it is formed, a bail secured in said eyes, and a stop to support said bail formed by one end of one of said wires obstructing the eye on the opposite end of the other wire.

THOMAS G. MELISH.